United States Patent
Garrett et al.

(10) Patent No.: US 7,299,996 B2
(45) Date of Patent: Nov. 27, 2007

(54) THERMOSTAT WITH ENERGY SAVING BACKLIT SWITCH ACTUATORS AND VISUAL DISPLAY

(75) Inventors: Carl L. Garrett, Bullard, TX (US); W. Randall Erwin, Tyler, TX (US); Timothy W. Storm, Tyler, TX (US)

(73) Assignee: American Standard International Inc., New York, NY (US)

( * ) Notice: Subject to any disclaimer, the term of this patent is extended or adjusted under 35 U.S.C. 154(b) by 529 days.

(21) Appl. No.: 10/988,252

(22) Filed: Nov. 12, 2004

(65) Prior Publication Data

US 2006/0102732 A1 May 18, 2006

(51) Int. Cl.
*G05D 24/00* (2006.01)
(52) U.S. Cl. .................. 236/94; 62/126; 165/11.1; 345/170
(58) Field of Classification Search .................. 236/94; 62/126, 129; 165/11.1; 345/170
See application file for complete search history.

(56) References Cited

U.S. PATENT DOCUMENTS

| | | | |
|---|---|---|---|
| 4,264,034 A | 4/1981 | Hyltin et al. | |
| 4,316,577 A | 2/1982 | Adams et al. | |
| 4,373,664 A | 2/1983 | Barker et al. | |
| 4,460,125 A | 7/1984 | Barker et al. | |
| 4,510,480 A | 4/1985 | Rossi et al. | |
| 5,505,377 A | 4/1996 | Weiss | |
| 6,435,418 B1 | 8/2002 | Toth et al. | |
| 6,549,870 B2 | 4/2003 | Proffitt et al. | |
| 6,956,561 B2 * | 10/2005 | Han ........................... | 345/170 |
| 2006/0060658 A1 * | 3/2006 | Proffitt et al. ............... | 236/1 C |

OTHER PUBLICATIONS

Samsung 10,800 BTU Energy Star rated Air Conditioner, AW10, Internet article, date unknown.

* cited by examiner

*Primary Examiner*—Marc Norman
(74) *Attorney, Agent, or Firm*—William J. Beres; William O'Driscoll

(57) ABSTRACT

An air conditioning system thermostat includes a visual display and plural switch actuators, respectively backlit by an electroluminescent lamp and LED light sources mounted on a circuit board disposed in a thermostat housing. A control circuit causes at least one switch actuator to be illuminated continuously and the light sources for the display and the remaining switch actuators are illuminated in response to actuation of any one of the switch actuators. Switch contact elements mounted on the switch actuators and the circuit board provide advantageous positioning of the LED light sources for the switch actuators. An energy savings switch actuator allows the control circuit to directly assume setback temperature settings in response to a first actuation and a second actuation resets the thermostat to the initial user set temperature settings.

21 Claims, 6 Drawing Sheets

THERMOSTAT WITH ENERGY SAVING BACKLIT SWITCH ACTUATORS AND VISUAL DISPLAY

BACKGROUND OF THE INVENTION

User operated controllers for air conditioning systems, commonly known as thermostats, should provide lighting for the visual display of control features, including actual temperature, temperature setpoints and operating mode, as well as lighting for the keypad switches which are user operated to set the control functions of the thermostat and to observe system operating conditions. However, thermostats with continuously lit visual displays and control switches are inefficient since they continuously consume energy when not required to do so, and the operating lives of the devices providing illumination, such as electroluminescent lamps and light emitting diodes are shortened. Accordingly, there has been a need to improve the lighting features of air-conditioning system thermostats whereby a thermostat visual display is lighted only when needed and certain user actuated switches or so-called key or pushbutton switches are illuminated also only when needed. In this way, energy savings may be obtained, certain elements may be eliminated from the thermostat, such as ambient light sensors, and the risk of unacceptable lighting element degradation or failure is reduced, all so as to reduce the cost of the thermostat and its operation.

There has also been a need recognized for providing a thermostat with a user actuated switch whereby the automatic preset energy saving temperature setback feature may be implemented to immediately change the temperature setpoints to the setback setpoints without a lengthy user controlled data entry process. In other words, there has been a need to provide a thermostat which, upon actuation of a single switch, will cause the temperature setpoints to adjust immediately to previously installed setback or offset temperature setpoints.

It is to provide for the above-mentioned needs and desiderata in the art of air conditioning system thermostats that the present invention has been developed.

SUMMARY OF THE INVENTION

The present invention provides an air conditioning system thermostat having an improved arrangement of lighting for the thermostat visual display and for thermostat control switch actuators which are illuminated in an improved manner and only when needed.

The present invention also provides a thermostat having an improved arrangement of lighting elements and related structure, such as a visual display and multiple pushbutton type or so-called key switches and the like. Still further, the present invention provides a user operated key or pushbutton type switch for instantly changing the temperature setpoints of the thermostat to the preprogrammed temperature offsets or setback setpoints so as to avoid any lengthy process for implementing the setback temperature settings of the thermostat controller.

In accordance with one aspect of the present invention, an air conditioning system thermostat is provided with a lighting arrangement for a thermostat visual display and for a user controlled keypad or multiple key switch actuators that are associated with the display wherein the display and certain ones of the user controlled switch actuators are illuminated only when needed. One or more user controlled switch actuators, such as the user controlled switch actuators for the temperature setpoints, are continuously illuminated so that the thermostat may be located and controlled in a dark environment. Upon actuation of one of the temperature setpoint switch actuators, or any one of the switch actuators, even momentarily, a visual display and all switch actuators are illuminated for a predetermined period of time.

In accordance with another aspect of the invention, an air conditioning system thermostat is provided with illumination for a visual display and user operated switches which includes a unique combination of illumination devices. The thermostat visual display is preferably characterized by a liquid crystal display (LCD) and is illuminated by an electroluminescent lamp. User operated pushbutton or so-called key switch actuators for system control, operating mode and status of system components, such as an air filter, are illuminated by light-emitting diode (LED) sources in an arrangement wherein only the temperature setpoint switch illuminating devices are continuously illuminated.

In accordance with yet a further aspect of the present invention an improved configuration and arrangement of user actuated control switches is provided wherein the switch actuators are formed as digitally actuatable members or buttons of a resilient light transmitting material and the switches are provided with an improved arrangement of electrically conductive paths or contact elements formed on the switch actuator members and disposed in relation to a circuit board which supports LED illuminating devices so that the respective actuators are properly illuminated. Still further, the overall arrangement and support for plural switches, a visual display element and associated illuminating devices is provided in an advantageous manner.

In accordance with still a further aspect of the invention, a thermostat for an air conditioning system is provided with temperature setpoint switch actuators which are continuously illuminated by LED sources and a visual display illuminating device and other switch actuators are energized only for short periods of time by way of an electroluminescent lamp and driver circuit and additional LEDs. Still further, when any one of the switch actuators is actuated, the electroluminescent lamp and all LED sources for switch actuators are energized for a predetermined period of time whereby the thermostat may be operated in a dark environment. The continuously illuminated temperature setpoint switch actuators provide a way of locating the thermostat in a dark environment without reducing the life of many of the illuminating devices and without requiring an ambient light level sensor. In this way, the arrangement for illuminating the thermostat display and control switches conserves power and is suitable for use in applications where only low levels of power are available at the thermostat, such as in so-called power stealing applications wherein there is no common connection between the thermostat and a control circuit transformer.

In accordance with yet a further aspect of the present invention, a thermostat is provided which includes an illuminated, so-called energy savings switch which may be actuated by the thermostat user at any time to change the temperature setpoints of the thermostat to the so-called offset or setback temperature setpoints by a single actuation of the energy saving switch. A second actuation of the energy saving switch returns the temperature setpoints of the thermostat to the previous settings. In this way, a user of the thermostat may conveniently change the temperature setpoints from the so-called normal operating condition values to the setback temperature values quickly and conveniently and without requiring the user to go through a lengthy process for changing a time based activation of the setback temperature values.

Those skilled in the art will further appreciate the above-mentioned advantages and superior features of the invention together with other important aspects thereof upon reading the detailed description which follows in conjunction with the drawings.

DETAILED DESCRIPTION OF A PREFERRED EMBODIMENT

Figure 1:
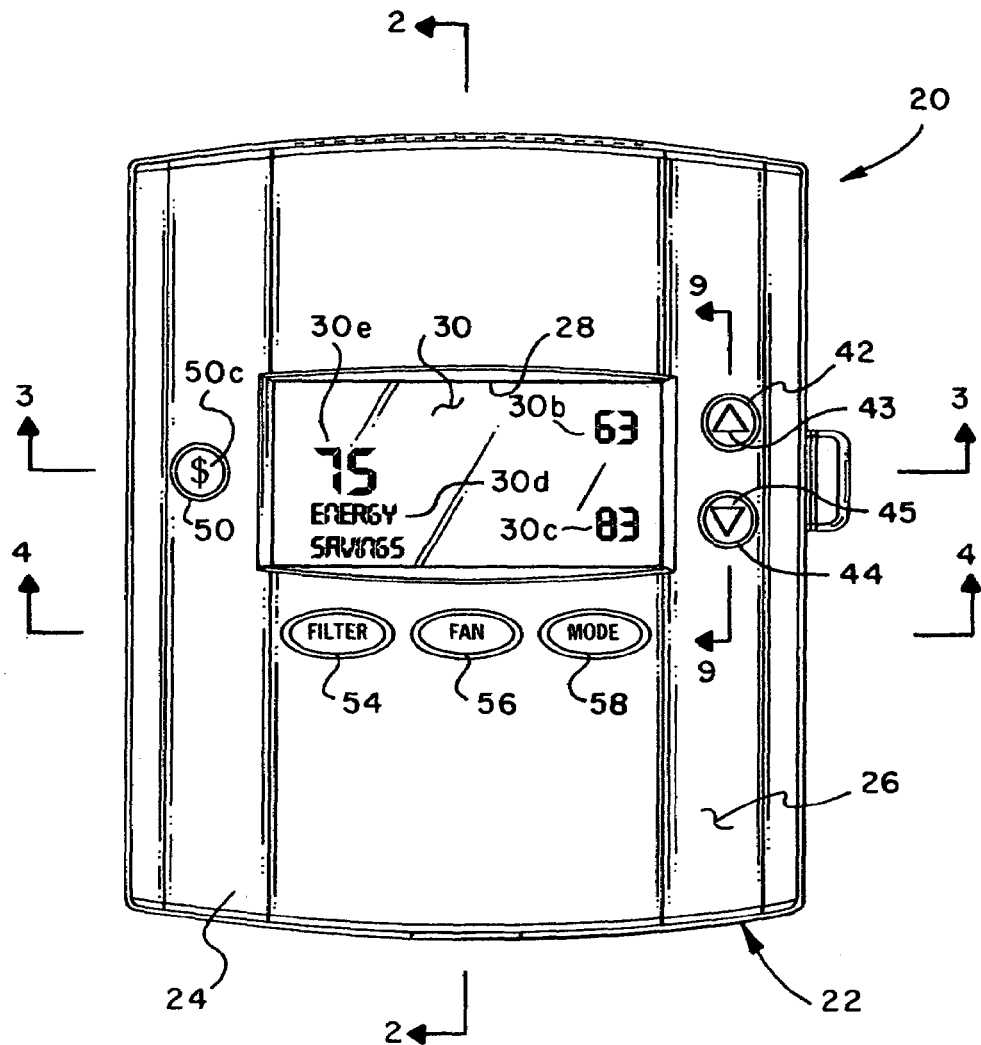
FIG. 1 is a front elevation view of an air conditioning system thermostat in accordance with the present invention.

In the description which follows, like elements are marked throughout the specification and drawings with the same reference numerals, respectively. The drawing figures are not necessarily to scale and certain features and elements may be shown in somewhat schematic or generalized form in the interest of clarity and conciseness.

Figure 2:
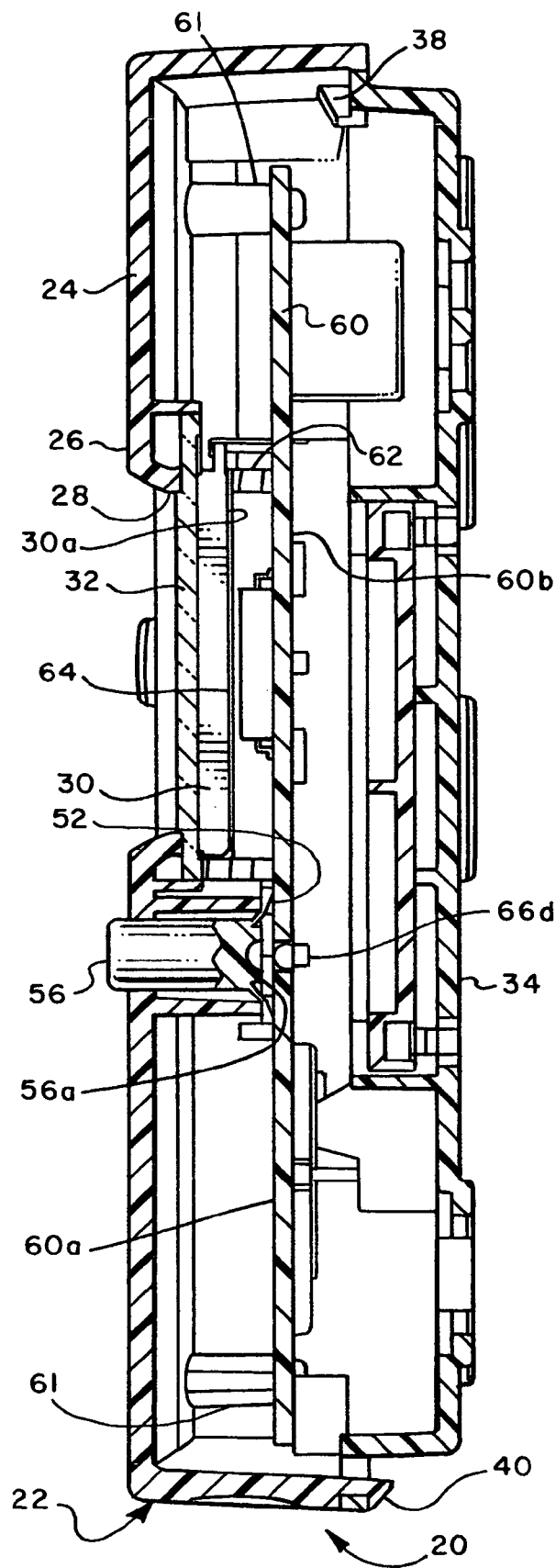
FIG. 2 is a section view taken generally along the line 2-2 of FIG. 1.
Figure 6:
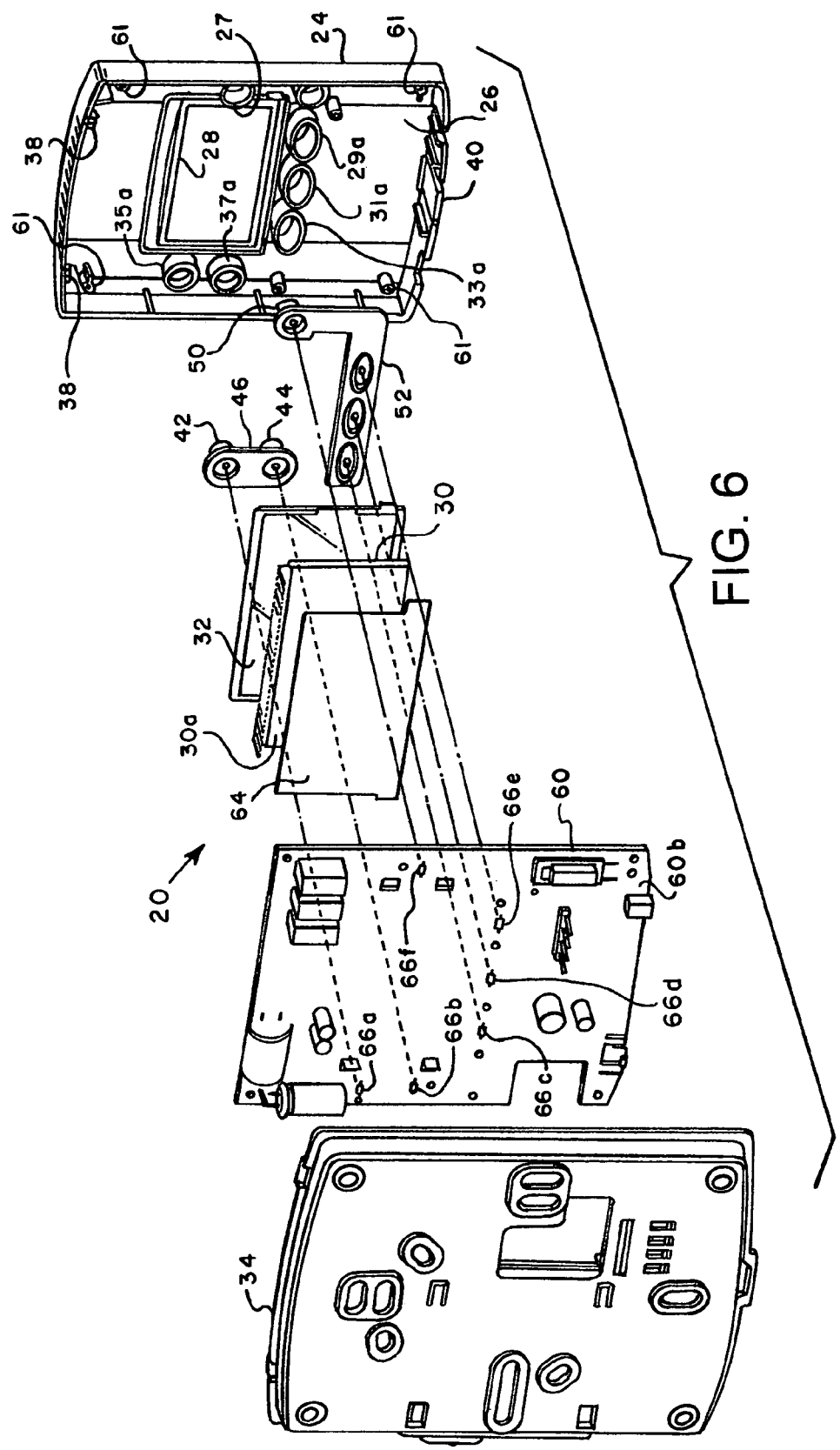
FIG. 6 is an exploded perspective view showing certain components of the thermostat of the present invention.

Referring briefly to FIG. 1, a thermostat, typically used for a residential or commercial air conditioning system, is illustrated and generally designated by the numeral 20. The thermostat 20 is provided with a generally rectangular two part housing 22 which includes a somewhat shell-like cover member 24, see FIG. 6 also, characterized by a front wall 26 having a generally rectangular opening 28 formed therein. Opening 28 provides for a user of the thermostat 20 to view a visual display 30, of a type to be described further herein. As shown in FIGS. 2 and 6, a suitable transparent lens 32 is adapted to be fitted in the opening 28 for covering the display 30.

Referring further to FIGS. 1 and 6, the thermostat 20 includes a base part 34, FIG. 6, to which the cover 24 is removably fitted and supported thereon in a conventional manner by spaced apart hook members 38 on cover 24, and a suitable resilient latch 40 on cover 24, each co-operable with respective bosses formed on the base part 34. As shown in FIG. 1, multiple pushbutton type or so-called key switch actuators are provided for operation by a user of the thermostat 20, including temperature setpoint switches with switch actuator members 42 and 44. Actuators 42 and 44 are each provided with suitable indicia 43 and 45, as shown in FIGS. 1 and 8, for indicating increasing or decreasing values of the temperature being set upon actuation of the respective switch actuators. Switch actuators 42 and 44 are preferably formed integral with a switch actuator base member 46, see FIGS. 6 through 9. The integral switch actuator structure comprising the actuator members 42, 44, and the base 46 are preferably formed of a light-transmitting, somewhat flexible polymer, such as silicone rubber, and molded with the indicia 43 and 45 thereon, and indicating increasing and decreasing temperatures to be set by actuation of the respective switch actuators 42 and 44.

Figure 3:
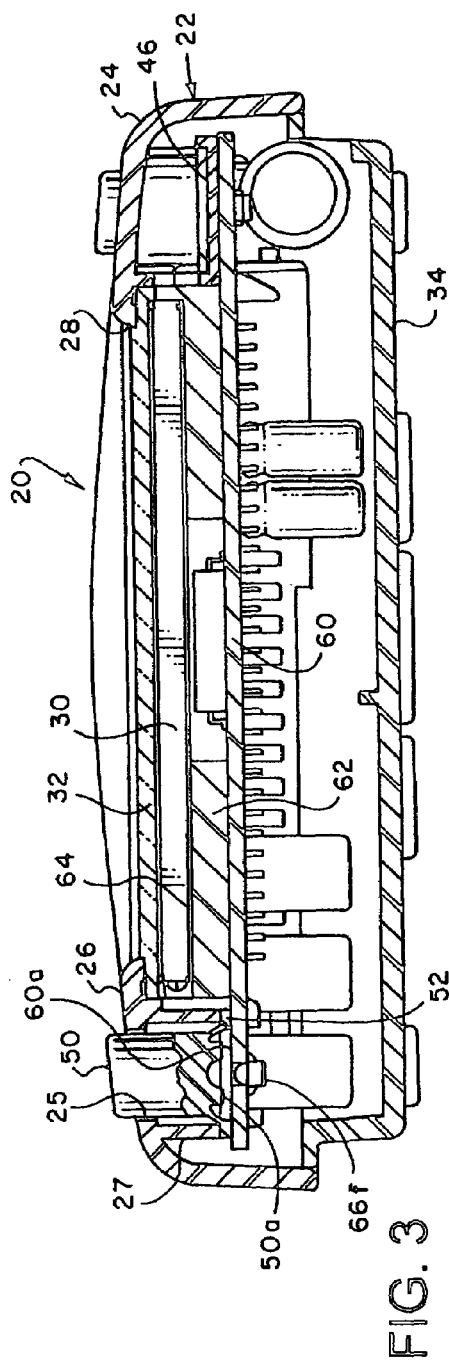
FIG. 3 is a section view taken generally along the line 3-3 of FIG. 1.
Figure 4:
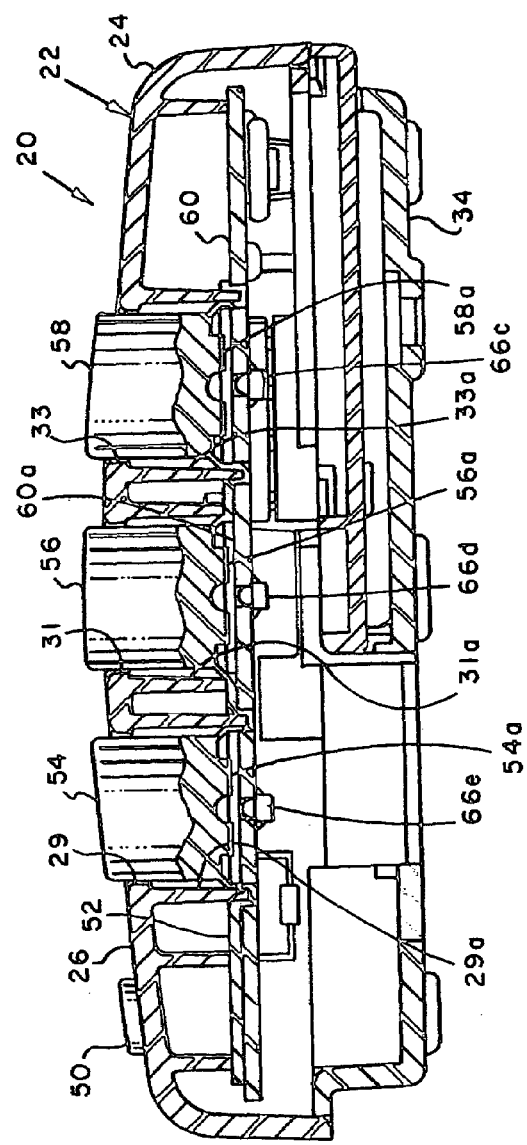
FIG. 4 is a section view taken generally along the line 4-4 of FIG. 1.
Figure 9:
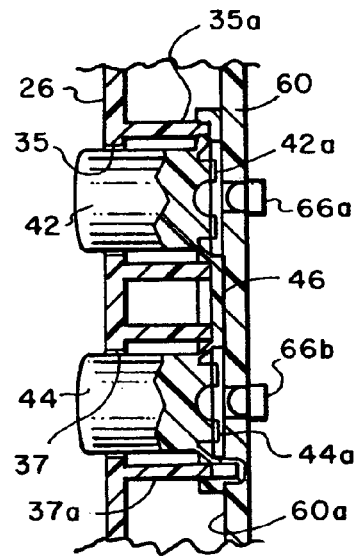
FIG. 9 is a section view taken generally from the line 9-9 of FIG. 1.

Referring again to FIGS. 1, 4, 5 and 6, a so-called energy savings switch actuator 50 is integrally formed on a switch actuator base member 52, FIG. 6, which also supports switch actuators 54, 56, and 58, FIG. 1, which may be used to verify the condition of an air conditioning system filter or filters, control of the system fan or blower and control of the system operating mode, respectively. As shown in FIG. 3, switch actuator 50 projects through an opening 25 in cover front wall 26 and is journaled somewhat by a circular boss 27, see FIGS. 3 and 6. As shown in FIG. 4, switch actuators 54, 56 and 58 project through suitable openings 29, 31 and 33 formed in cover front wall 26 and are also journaled somewhat by respective elliptical-shaped bosses 29a, 31a, and 33a, see FIGS. 4 and 6. Switch actuators 42 and 44 are also journaled by respective bosses 35a and 37a, FIG. 9, and project through suitable circular openings 35 and 37 in cover front wall 26, as also shown in FIG. 9. Switch actuators 50, 54, 56, and 58 and their associated support member 52 are also, preferably, integrally molded of a light-transmitting polymer of the same type as switch actuators 42 and 44.

Referring now to FIGS. 2 and 6, the thermostat 20 is further characterized by a generally planar circuit board member 60 on which a substantial number of electrical circuit components for the thermostat 20 are suitably mounted. Circuit board 60 is adapted to be mounted on cover 24 on suitable stand-off bosses 61 as shown in FIGS. 2 and 6. Circuit board 60 is also provided with a suitable stand-off support member 62, FIG. 2, for supporting an electroluminescent lamp member, 64, see FIGS. 2, 3, and 6. Electroluminescent lamp member 64 is a generally thin-walled planar member mountable against the backside 30a, FIGS. 2 and 6, of display member 30, whereby the lens 32, the display member 30, and the lamp member 64 are all secured in closely spaced or contacting relationship between the stand-off 62 and the outer wall 26 of cover member 24.

A so-called backside 60b, FIG. 6, of circuit board 60 supports respective light sources comprising light emitting diodes or LEDs 66a, 66b, 66c, 66d, 66e, and 66f, all as shown in FIG. 6. As shown in FIG. 3, LED 66f projects through a suitable opening in circuit board 60 so that this LED may illuminate switch actuator 50. In like manner, viewing FIG. 4, LEDs 66c, 66d, and 66e, project through suitable openings in circuit board 60 for illuminating switch actuators 54, 56, and 58. Lastly, viewing FIG. 9, LEDs 66a and 66b project through suitable openings in circuit board 60 for illuminating switch actuators 42 and 44.

Figure 5:
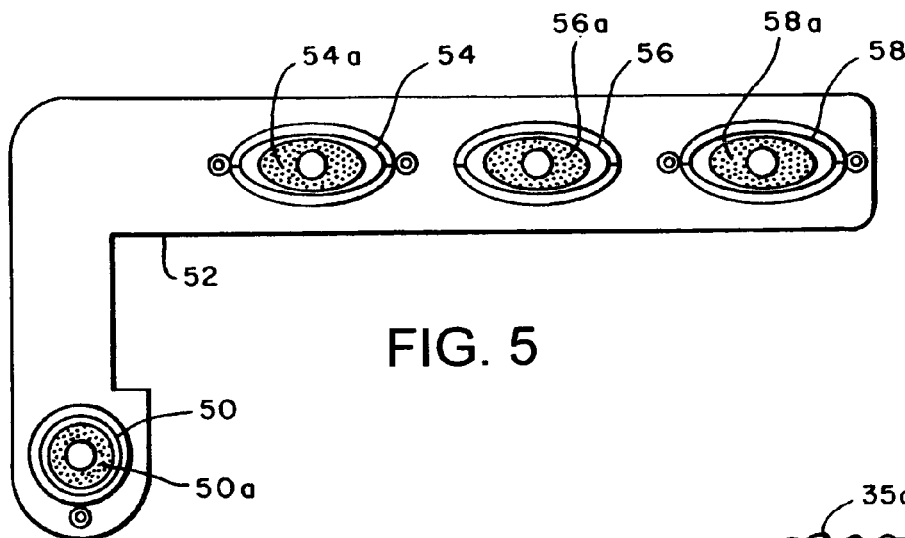
FIG. 5 is a plan view of a pushbutton or key pad switch actuator assembly in accordance with the present invention.
Figure 7:
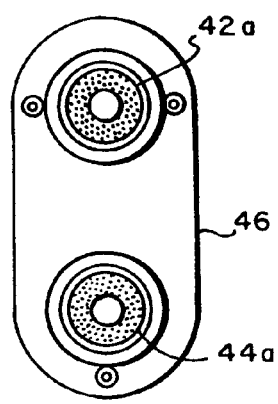
FIG. 7 is a back elevation view of another one of the key pad switch actuator assemblies.
Figure 8:
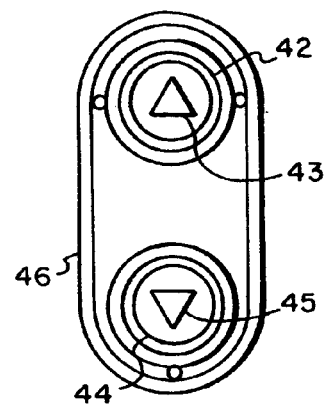
FIG. 8 is a front elevation view of the switch actuator assembly shown in FIG. 7.

An advantageous configuration of the switch actuators 42, 44, 50, 54, 56, and 58 is one whereby, for the switch actuators 42 and 44, suitable annular disc, electrically conductive contact elements 42a and 44a, see FIG. 7, are formed on the base portions of the actuators 42 and 44, as illustrated, and normally stand-off from surface or face 60a of circuit board 60. In like manner, as shown in FIG. 5, switch actuators 50, 54, 56 and 58 are provided with suitable annular disc, electrically conductive, contact elements 50a, 54a, 56a, and 58a, respectively, which are also disposed in a somewhat stand-off position, normally, from surface 60a of circuit board 60, FIG. 4. Thanks to the annular configuration of the contact elements 42a, 44a, 50a, 54a, 56a, and 58a, light emitted from the LEDs, which are mounted adjacent to these respective contact elements, is transmitted directly to and emitted from the associated switch actuators 42, 44, 50, 54, 56, and 58, respectively.

Figure 10:
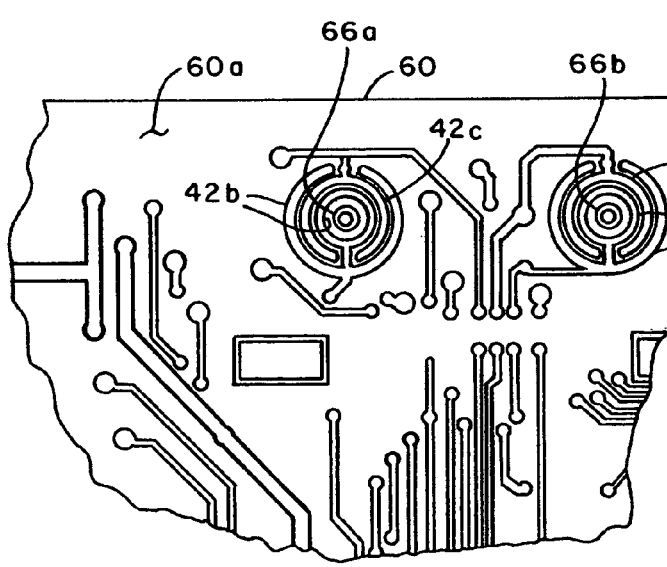
FIG. 10 is a plan view of a portion of a circuit board for the thermostat of the invention showing a typical arrangement of switch contact elements.

Referring briefly to FIG. 10, an advantageous configuration of the respective switches associated with the switch actuators 42 and 44 is illustrated whereby concentric substantially circular contact elements 42b and 42c, associated with a suitable circuit for the thermostat 20 and electrically isolated from each other, are provided on circuit board 60 on face 60a thereof. Upon digital actuation of switch actuator 42, which is elastically deflectable, contact element 42a engages both contact elements 42b and 42c to close a suitable circuit associated with the switch actuator 42. As shown in FIG. 10, a similar configuration of contact elements 44b and 44c provides for closure of a switch formed by the contact elements 44a, 44b, and 44c when switch actuator 44 is depressed to cause contact element 44a to engage both contact elements 44b and 44c. Release of switch actuators 42 and 44 restores these members to the switch open position shown in FIG. 9. Moreover, the annular ring-like contact elements 42b, 42c, 44b, and 44c are advantageously arranged with respect to the annular contact elements 42a and 44a to accommodate the LED light sources 66a and 66b also, as shown in FIG. 10, so that these light sources may illuminate actuators 42 and 44. Those skilled in the art will recognize and appreciate that the switch actuators 50, 54, 56 and 58 are all associated with similar contact elements mounted on circuit board 60 and disposed in an annular array around the respective LEDs 66f, 66e, 66d, and 66c, respectively. Accordingly, the switches associated with respective switch actuators 42, 44, 50, 54, 56 and 58 are normally open switches and are closed upon digital push or pressing actuation of the respective switch actuators. The switch actuators 50, 54, 56 and 58 are also elastically deflectable and restore to the switch open positions shown in FIGS. 3 and 4 when released.

Figure 11:
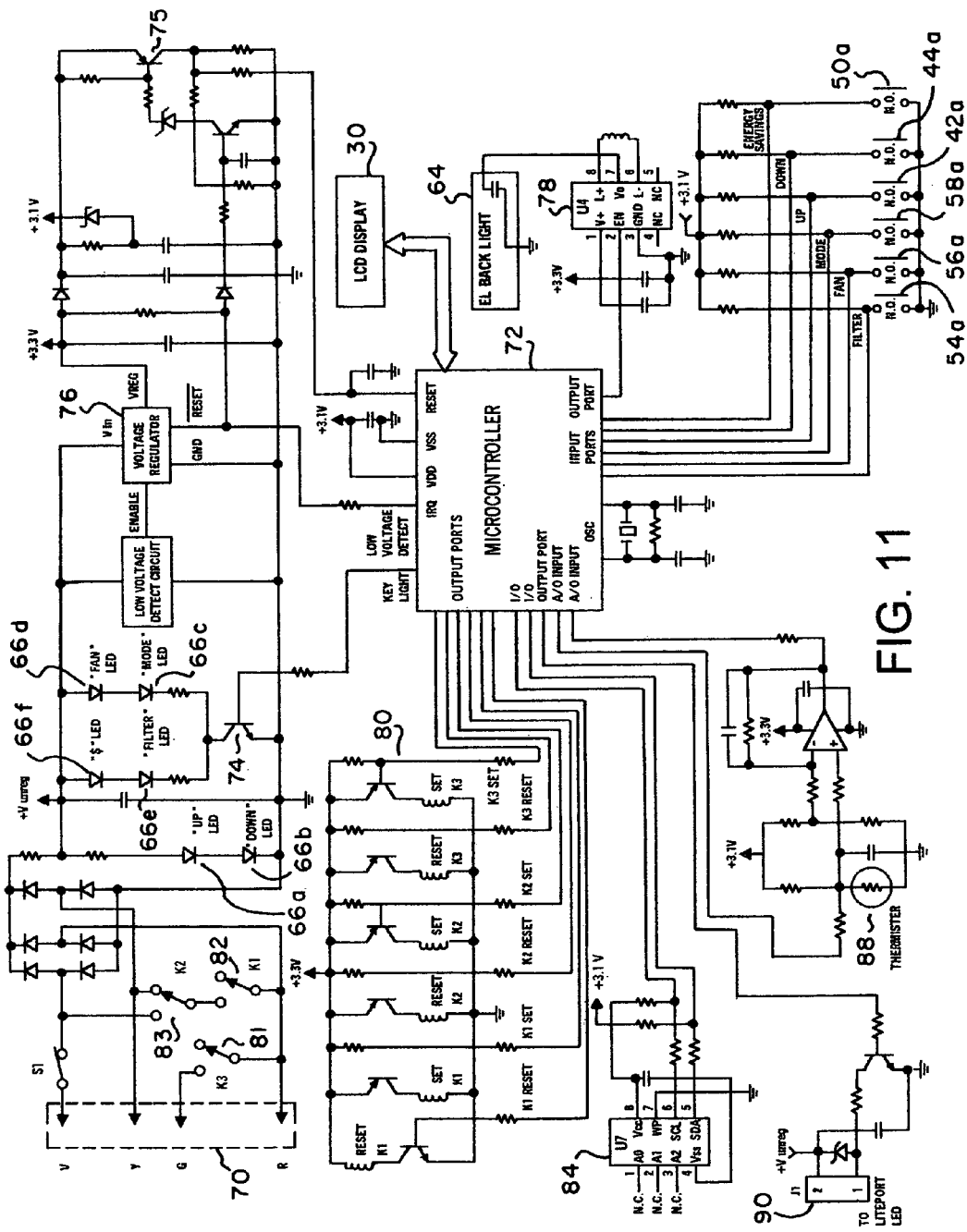
FIG. 11 is a somewhat simplified circuit diagram showing the circuitry for the switches and the lighting elements for the thermostat of the invention.

Referring now to FIG. 11, there is illustrated a somewhat simplified diagram for the control circuitry of the thermostat 20. Substantially all of the components illustrated in FIG. 11 are mountable on circuit board 60 and are disposed within the housing 22 of the thermostat 20. Low voltage alternating current power is supplied to a terminal block 70 which may be suitably rectified to continuously energize LEDs 66a and 66b in accordance with the circuit diagram illustrated. However, LEDs 66c, 66d, 66e, and 66f are only energized when a signal is provided from a microcontroller 72 to a transistor 74. Reduced voltage DC power is supplied to microcontroller 72 via a voltage regulator 76 and a circuit 75 which provides low voltage power to microcontroller 72 in the event of a power failure of a source, not shown, connected to terminal block 70.

The control circuit for thermostat 20 illustrated in FIG. 11 is further characterized by a latching relay circuit 80 for actuating control switches 81, 82 and 83 which effect operation of a system fan and heating or cooling operation of an air conditioning system, not shown, associated with the thermostat. The control circuit illustrated in FIG. 11 includes an eeprom circuit 84 for storing data from microcontroller 72 including control settings associated with the thermostat 20. Still further, a temperature sensor circuit 88 is connected to the microcontroller 72 for operation to sense the temperature of the space controlled by the thermostat 20. A connector 90 associated with microcontroller 72 is operable to connect the control circuit shown in FIG. 11 to suitable diagnostic equipment, not shown, for diagnosing the status of the thermostat 20.

As shown in FIG. 11, microcontroller 72 is operably connected to the display 30 and is operable to illuminate the electroluminescent lamp 64 by way of a lamp driver circuit 78. The switches associated with the respective contact elements 42a, 44a, 50a, 54a, 56a, and 58a illustrated are operably connected to the microcontroller 72. Microcontroller 72 is programmed to provide for illuminating the LEDs 66c, 66d, 66e, and 66f, as well as the display 30 when any one of switches associated with contact elements 42a, 44a, 50a, 54a, 56a, or 58a is actuated. In this way, when any one of the switch actuators 42, 44, 50, 54, 56, or 58 is engaged by a user of the thermostat 20, the display 30 and all of the switch actuators are illuminated. Of course, switch actuators 42 and 44 are continuously illuminated, which is advantageous, since this enables a person to locate the thermostat 20 in a dark environment. However, pressing either one of these switch actuators just once will not change any thermostat setting. Accordingly, energy is conserved since LEDs 66c, 66d, 66e, and 66f, and electroluminescent lamp 64, are only illuminated for about ten seconds after any one of the aforementioned switch actuators is pressed, so as to enable a user of the thermostat 20 to either view the display 30 or make a change in the thermostat setting, such as by actuation of any one the switch actuators 42, 44, or 50, or to change the mode of operation or other control functions by actuation of one of the switch actuators 54, 56, or 58. Accordingly, the physical arrangement of the light sources for each of the switch actuators and the visual display described herein is advantageous together with the operating mode of the thermostat 20 as described herein.

Still further, the thermostat 20 advantageously includes the switch actuator 50 whereby a user of the thermostat 20 may quickly change the temperature settings of the thermostat to the respective setback temperatures in both heating and cooling modes. For example, as shown in FIG. 1, upon actuation of switch actuator 50, the microcontroller 72 will change the temperature setpoints from those set by the switch actuators 42 and 44 to predetermined setback or offset temperatures. The setback temperatures will be displayed on display 30, as indicated by the temperatures displayed at 30b and 30c, as illustrated in FIG. 1. Actuation of switch actuator 50 also displays an icon 30d indicating that the temperature setpoints are now at the reduced setpoint values, that is 63° F. and 83° F., for example, as illustrated by the indicia 30b and 30c, respectively. Accordingly, the microcontroller 72 is programmable in such a way that a first actuation of switch actuator 50 will cause the temperature settings of the thermostat 20 to change from those previously set by the actuators 42 and 44 to setback temperature settings previously programmed into the microcontroller by the user, or a factory default setting of five degrees Fahrenheit, for example. A second actuation of switch actuator 50 will cause thermostat 20 to reset itself to those settings which had been set by the switch actuators 42 and 44, respectively. When the thermostat 20 is in the so-called energy savings mode, the icon "ENERGY SAVINGS" 30d will be shown on the display 30, as shown in FIG. 1. Indicia is also provided on switch actuator 50, as indicated by the currency symbol 50c in FIG. 1. Display 30 is also operable to provide suitable indicia 30e indicating actual room or indoor temperature, for example, as well as other indicia, not shown, when actuation of one or more of actuators 54, 56 or 58 occurs.

The construction and operation of the improved thermostat 20 is believed to be readily understandable to those of skill in the art based on the foregoing description. Commercially available components and engineering materials may be used to fabricate the thermostat 20 and programming of the microcontroller 72 is believed to be within the purview of one of ordinary skill in the art of air conditioning system operating controls. Although a preferred embodiment of the invention has been described in detail herein, those skilled in the art will also recognize that various substitutions and modifications may be made without departing from the scope and spirit of the appended claims.

What is claimed is:

1. In a thermostat for an air conditioning system, a visual display and a plurality of user operable control switch actuators, plural light sources for illuminating said switch actuators and said visual display, respectively, and a control circuit operably associated with said switch actuators and said light sources, said control circuit being operable to maintain selected ones of said light sources in an energized state and responsive to actuation of at least selected ones of said switch actuators to cause said light sources for said display and at least selected ones of said switch actuators to be energized to at least temporarily illuminate said display and selected ones of said switch actuators.

2. The thermostat set forth in claim 1, wherein:
at least one of said switch actuators includes a light source which is continuously illuminated for locating said thermostat by a user in a dark environment.

3. The thermostat set forth in claim 1, wherein:
said light source for said visual display is an electroluminescent lamp.

4. The thermostat set forth in claim 3 wherein:
said lamp is disposed between said visual display and a circuit board disposed in a housing of said thermostat.

5. The thermostat set forth in claim 1, wherein:
said light sources for at least selected ones of said switch actuators are light emitting diodes.

6. The thermostat set forth in claim 1, wherein:
at least portions of said control circuit are mounted on a circuit board supported by a housing, said switch actuators being mounted adjacent said circuit board, and said light sources for said switch actuators are mounted on said circuit board for projecting light on said switch actuators for illuminating same.

7. The thermostat set forth in claim 6, wherein:
said switch actuators include annular contact elements mounted thereon and said circuit board includes cooperating contact elements mounted thereon, said light sources for said switch actuators being mounted centrally with respect to said contact elements to project light onto said switch actuators, while allowing said contact elements to engage each other to close respective switches associated with said switch actuators.

8. The thermostat set forth in claim 1, wherein:
at least one of said switch actuators is operably connected to said control circuit to change temperature settings of said thermostat from preset temperature settings for heating and cooling to respective setback temperature settings for heating and cooling upon a first actuation of said one switch actuator.

9. The thermostat set forth in claim 8, wherein:
said one switch actuator is operable in response to a second actuation to cause said control circuit to reset the temperature settings of said thermostat to said preset temperature settings.

10. The thermostat set forth in claim 1, including:
switch actuators for setting upper and lower setpoint temperatures for said thermostat illuminated by at least one light source which is continuously energized when electrical power is supplied to said thermostat.

11. The thermostat set forth in claim 10 wherein:
said control circuit is operable in response to a first actuation of said switch actuators for setting said setpoint temperatures to energize said light sources without changing said setpoint temperatures, respectively.

12. The thermostat set forth in claim 1 wherein:
at least selected ones of said switch actuators are formed of an elastically deflectable light transmitting polymer material.

13. In a thermostat for an air conditioning system, a housing supporting a visual display and a plurality of user operable light transmitting control switch actuators, plural LED light sources associated with said switch actuators, respectively, an electroluminescent lamp for illuminating said visual display, and a control circuit operably associated with said switch actuators and said light sources, said control circuit being operable to maintain at least one of said LED light sources in a continuously energized state and said control circuit is responsive to actuation of any one of at least selected ones of said switch actuators to cause said light sources for said display and said switch actuators to be energized to at least temporarily illuminate said display and said switch actuators, respectively.

14. The thermostat set forth in claim 13 wherein:
said lamp is disposed between said visual display and a circuit board disposed in a housing of said thermostat.

15. The thermostat set forth in claim 13, wherein:
at least portions of said control circuit are mounted on a circuit board supported by a housing, said switch actuators being disposed adjacent said circuit board, and said light sources for said switch actuators are mounted on said circuit board for projecting light on said switch actuators for illuminating same.

16. The thermostat set forth in claim 15, wherein:
said switch actuators include annular contact elements mounted thereon and said circuit board includes cooperating contact elements mounted thereon, and said light sources for said switch actuators are mounted centrally with respect to said contact elements to project light onto said switch actuators while allowing said contract elements to engage each other to close respective switches associated with said switch actuators.

17. The thermostat set forth in claim 13, wherein:
one of said switch actuators is operably connected to said control circuit to change temperature settings of said thermostat from preset temperature settings for one of heating and cooling to respective setback temperature settings for one of heating and cooling upon a first actuation of said one switch actuator.

18. The thermostat set forth in claim 17, wherein:
said one switch actuator is operable in response to a second actuation to cause said control circuit to reset the temperature settings of said thermostat to said preset temperature settings.

19. In a thermostat for an air conditioning system, a housing supporting a visual display and a plurality of user operable control switch actuators, plural light sources associated with said switch actuators and said visual display, respectively, a control circuit operably connected to said switch actuators and said light sources, a circuit board supporting said light sources for disposition adjacent to said switch actuators, respectively, for projecting light on said switch actuators for illuminating same and said switch actuators including contact elements operable to engage cooperating contact elements on said circuit board adjacent to said light sources, respectively;

wherein said contact elements on said switch actuators are annular and said cooperating contact elements are disposed around respective openings in said circuit board through which light is projected by said light sources whereby said light sources are operable project light onto said switch actuators while allowing said contact elements of said switch actuators and said circuit board to engage each other to close respective switches associated with said switch actuators.

20. The thermostat set forth in claim 19 wherein:

said switch actuators are formed of a light transmitting elastically deflectable polymer.

21. In a thermostat for an air conditioning system, a housing supporting a visual display and a plurality of user operable control switch actuators, plural light sources associated with said switch actuators and said visual display, respectively, a control circuit operably connected to said switch actuators and said light sources, a circuit board supporting said light sources for disposition adjacent to said switch actuators, respectively, for projecting light on said switch actuators for illuminating same and said switch actuators including contact elements operable to engage cooperating contact elements on said circuit board adjacent to said light sources, respectively; wherein:

said contact elements on said switch actuators comprise annular disc members, said cooperating contact elements on said circuit board comprise substantially annular ring elements and said light sources are disposed substantially centrally with respect to said disc members and said ring elements, respectively.

* * * * *